United States Patent

[11] 3,542,470

[72] Inventor Clarence Samuel Ost
118 N. Mansfield Ave., Margate City, New Jersey 08402
[21] Appl. No. 781,229
[22] Filed Dec. 4, 1968
[45] Patented Nov. 24, 1970

[54] AUTOMATIC COMPUTING DENSITY RANGE COUPLED LIGHT INTEGRATOR
23 Claims, 5 Drawing Figs.

[52] U.S. Cl. ............................................. 355/68, 355/71
[51] Int. Cl. .............................................. G03b 27/76
[50] Field of Search ................................. 355/68, 71

[56] References Cited
UNITED STATES PATENTS
3,249,000  5/1966  Pack ........................... 355/68
3,335,638  8/1967  Atkinson ..................... 355/68X Primary Examiner—John M. Horan
Assistant Examiner—Richard A. Wintercorn
Attorney—Sherman Levy ABSTRACT: A photographic apparatus for producing screened reproductions consisting of a camera or enlarger system with a copy support and an easel for photosensitive material. Exposure lamps are provided to illuminate the copy. The exposure lamps are energized by a control circuit including a photo-electrically operated selectively settable light integrator which is reset from one adjustable balancing arm of a bridge circuit. Another arm of the bridge circuit includes a light-responsive resistor probe which can be placed at different portions of the copy to respond to the densities thereof. The balancing arm can be adjusted for balance at a value corresponding to a selected highlight density area of the copy, or to the screen range minus a selected shadow density area, to thus respectively cause the integrator to provide in each case a corresponding amount of light flux from the exposure lamps. The bridge circuit includes another balancing arm which can be automatically adjusted in accordance with the screen density range capability, and still another balancing arm which can be set to represent excess density, which is automatically computed while a selected shadow density area of the copy is being observed by the light-responsive resistor probe. The system includes a flash lamp adjacent the easel, energized by another selectively settable light integrating circuit which is reset in accordance with the setting of the last-named balancing arm so as to provide a flash exposure having an amount of light flux corresponding to the excess density of the copy density range relative to the screen density range capability.

Patented Nov. 24, 1970

INVENTOR
CLARENCE S. OST
BY Sherman Levy
ATTORNEY

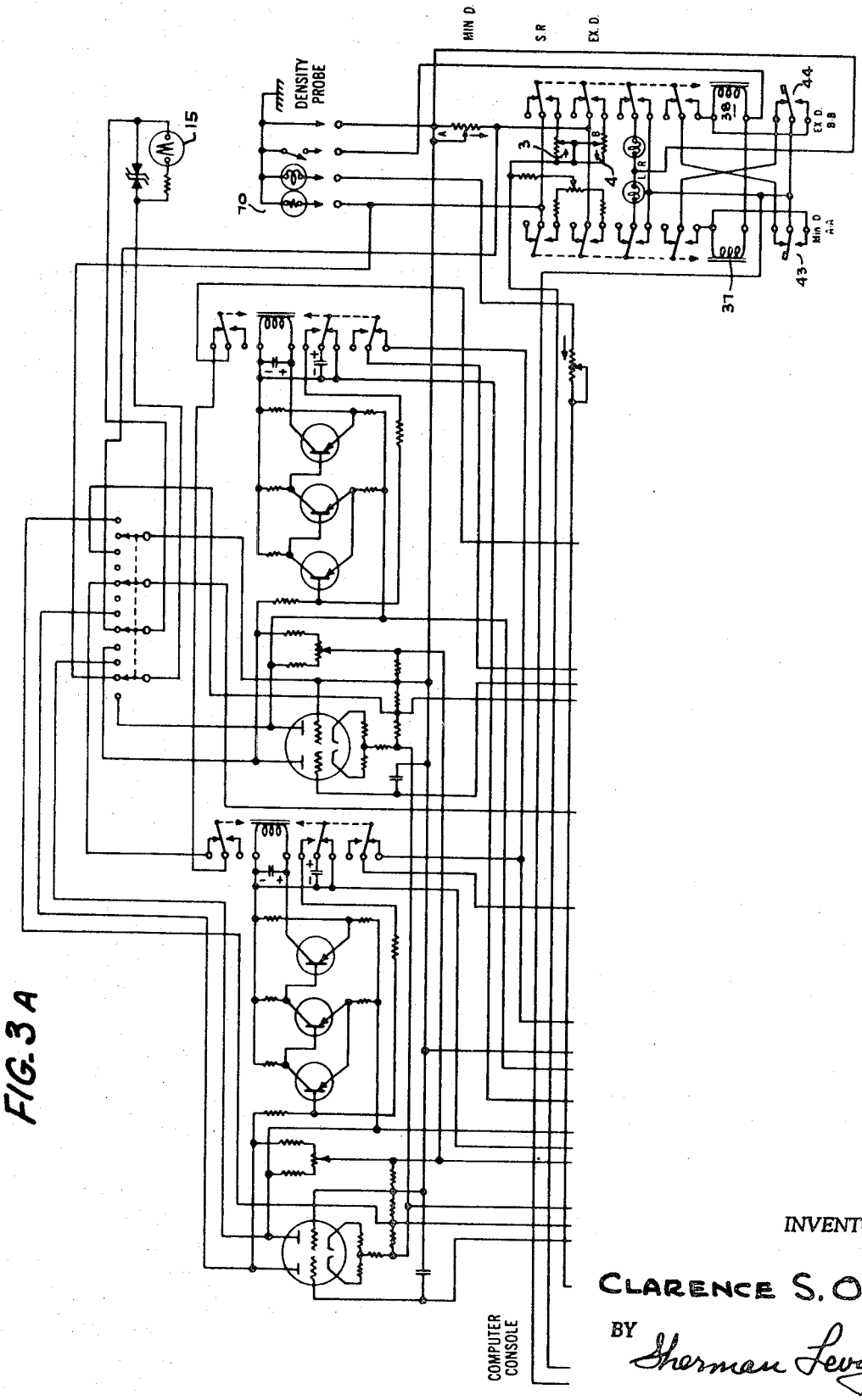

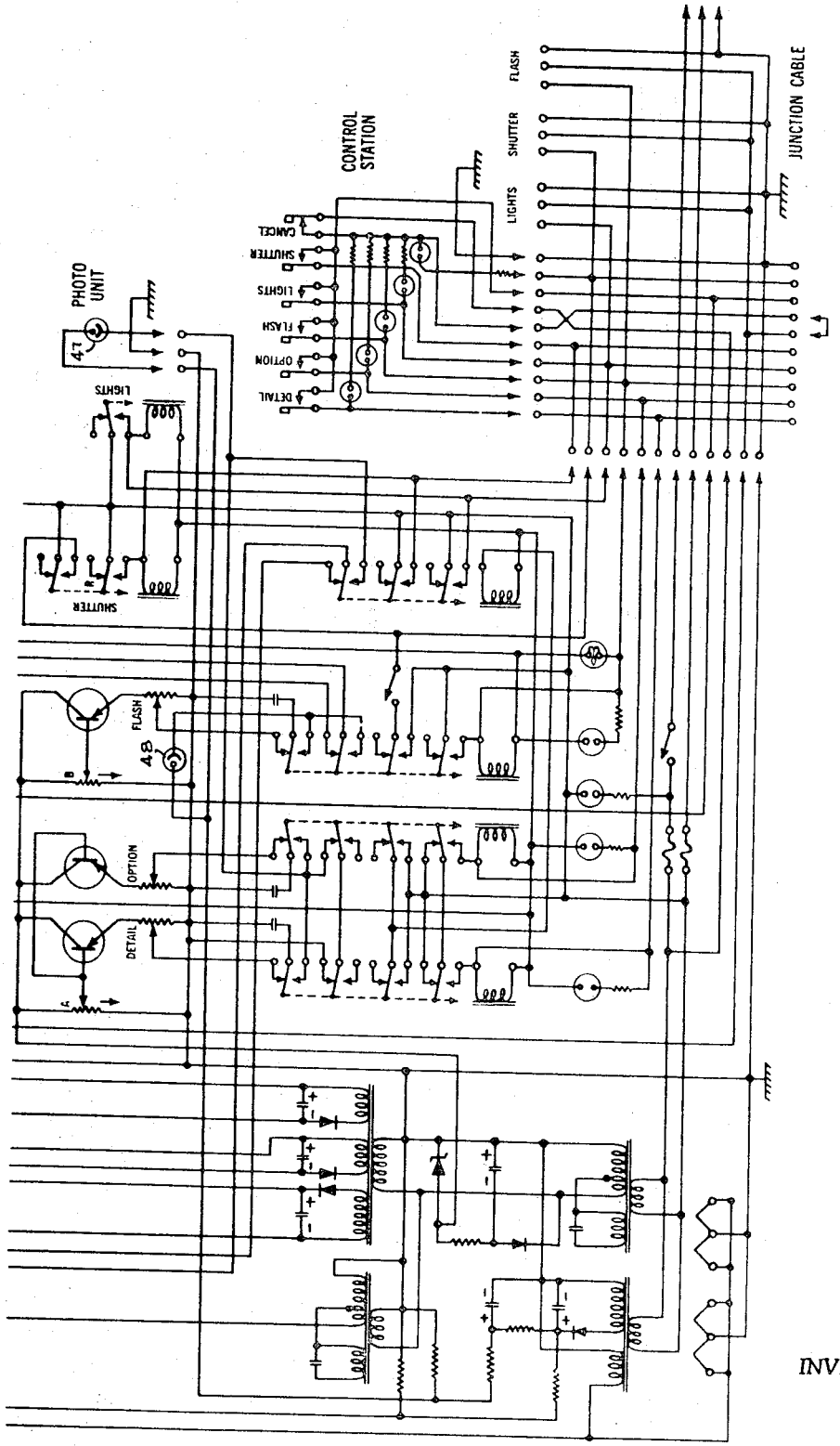
FIG. 3.B
INVENTOR
CLARENCE S. OST
BY
Sherman Levy
ATTORNEY

AUTOMATIC COMPUTING DENSITY RANGE COUPLED LIGHT INTEGRATOR

This invention relates to photographic apparatus, and more particularly to exposure control devices.

A main object of the invention is to provide a novel and improved combination of photoelectric and electronic elements comprising an instrument to be used in the photographic industry for automatically calculating the various exposures required and for then controlling the time duration of these exposures according to the intensity of the exposing radiation, so as to deliver a precalculated integral of radiant flux.

The present invention will find its most useful application in Graphic Arts photography, and more particularly in the photo techniques employed in producing screened negatives and positives from optically homogeneous copy.

Those skilled in the art know that there is a limitation in the ability of the halftone screen to reproduce a range of tones. As an example: if the tonal range of the copy to be photographed in terms of the ratio of light intensity reflected from (or transmitted through, in case the copy is a transparency) the minimum and maximum density areas is 200 to 1, and the screen is limited in its ability to reproduce a range of tones in the ratio of 25 to 1, then tones will be lost either in the minimum or maximum or maximum density areas of the copy, or in both areas, depending upon the magnitude of the basic detail exposure or exposures given. In this example as in the majority of cases, the copy range is greater than the screen range. If, as in the case above, these ratios are expressed as common logarithms (density) then the copy and the screen have a density range of 2.3 and 1.4 respectively, which leaves an excess copy density range of .9 which cannot be accommodated by the screen. $2.3 - 1.4 = .9$.

It is well known in the art that the screen range will be affected by an variation in optical geometry that will change the umbra, P-umbra distribution (vignette characteristic) at the focal plane behind each screen opening. Various densities of magenta and yellow CC filters used with magenta contact screens will vary the screen range. Also, if the exposure is split, partly with and partly without CC filters, the ratio of the 2 exposures will change the screen range. Also, the screen range will be altered if the ratio between a no-screen or bump exposure, and the detail screen exposure changes. If optical screens are used, any change between the ratio of stop diameter divided by camera extension to screen opening divided by screen distance, will alter the vignette characteristic and thus change the screen range. It is also known that changes in processing conditions which include time, temperature and chemistry, will alter the screen range by affecting the of the developed photographic material.

It is very difficult to manipulate the factors affecting screen range mentioned above with any degree of predictable effect. However, it is possible to hold a predetermined set of these factors constant and vary a flash or fogging exposure, which lengthens the screen range and furthermore can be controlled quite precisely.

It should be noted here that the basic flash exposure is that amount of overall fogging exposure to the photographic material employed with the screen in place, without the assistance of exposure to the copy, sufficient to produce, upon processing, the optimum geometric size shadow dot required for the process. If there is no excess density a flash is not required. However, if there is excess density, then the amount of flash required is determined by the amount of excess density. The following equation states that the actual flash exposure is equal to the basic flash exposure times the quantity one minus the reciprocal of ten raised to the excess density power:

$$F_a = F_b \left(1 - \frac{1}{10^{D_{ex}}}\right)$$

where $F_a$ is the actual flash exposure, $F_b$ is the basic flash exposure, and $D_{ex}$ is the excess density.

It should be noted here that the equation above, which utilizes a flash exposure as a portion of the total basic flash, which portion is a function of the excess density, in order to vary the screen range so as to equal the copy range is known in the art as the "Controlled Flash Technique" and is widely used.

As is well known amongst those skilled in the art, the basic detail exposure is that exposure, or combination of exposures to the copy, regardless of copy or screen range, which will reproduce the minimum density area of the copy as the minimum geometric dot size required for the process. If this minimum density area of the copy increases or decreases in density, then the exposure should do likewise in the proper proportion, so as to maintain this reproduced minimum dot size requirement uniform from reproduction to reproduction. The following equation expresses this: where the actual exposure is seen to be equal to the basic exposure multiplied by ten raised to the minimum density power.

$$E_a = E_b \cdot 10^{(D_{min})}$$

where $E_a$ is the actual exposure, $E_b$ is the basic exposure, and $D_{min}$ is the minimum density.

The technique stated above of varying the detail exposure or exposures for the purpose of maintaining a uniform optimum dot size in the reproduction from the minimum density area of the copy will be hereinafter referred to as "Minimum Density Shift" in the discussion to follow.

A certain small proportion of all copy being photographed in the industry will fall into the category of having a range less than the screen range established by the detail exposure or exposures employed. If this be the case, then of course a flash is not necessary. However, it would be desirable to reduce the detail exposure or exposures by the proper amount, so that the maximum density area of the copy will reproduce the minimum geometric shadow dot required for the process. The proper amount of this exposure required is expressed by the following equation: where the actual detail exposure of exposures is equal to the basic detail exposure or exposures times the reciprocal of ten raised to the quantity, screen range minus maximum copy density power.

$$E_a = E_b \cdot \frac{1}{10^{(SR - D_{max})}}$$

where $E_a$ is the actual detail exposure, $E_b$ is the basic detail exposure, SR is the screen range, and $D_{max}$ is the maximum copy density.

The technique described above wherein the detail exposure or exposures are shortened by the proper amount so as to reproduce a minimum geometric shadow dot required for the process from the maximum density area of the copy, in which the copy range is less than the screen range, will be hereinafter referred to as "Maximum Density Shift" in the discussion to follow.

When employing the maximum density shift equation, an excess screen range at the highlight end of the copy tonal range will result, thus reproducing from the minimum density area of the copy a geometric highlight dot too large for the process. In this case, if a single screened exposure was used, the effective screen range can be shortened by employing a supplementary no-screen or "bump" exposure. If the original detail exposure was a combination of a no-screen and screened exposure, then the proportion of no-screen to screened exposure should be increased.

If the no-screen or bump exposure stated in the above examples is of the proper amount, relative to the screened exposure, then the effective screen range can be made to match the copy range exactly.

The foregoing is merely a brief description of the principles involved. In actual practice numerous techniques are employed, and these include the use of neutral as well as magenta vignetted contact screens; also, optical halftone screens are in wide use. Many procedures are used with the above media to alter effective screen range. As mentioned previously, with the magenta contact screens, CC filters are utilized, and with optical halftone screens multistop exposures are given, which affect the umbra, P-umbra image. It should be noted however, that despite all these ramifications, the basic mathematics stated above are applicable to all the various techniques.

It is the prime purpose of the present invention to provide a system or combination of components comprising a machine or instrument so designed as to be able to gather density information from the copy to be photographed, store, and then utilize this information in a computer system to solve the equations involved and then automatically apply these mathematical solutions so as to modify previously programed basic exposures and then control the time duration of these exposures according to the intensity of the exposing radiation, so as to deliver a precalculated integral of radiant flux to the photosensitive material.

Further objectives of the invention will become apparent from the following description and claims, and from the accompanying drawings, wherein:

FIGS. 3A and 3B together form a schematic wiring diagram of a practical device embodying the principles and concepts of the present invention.

Figures 1, 2, 4:
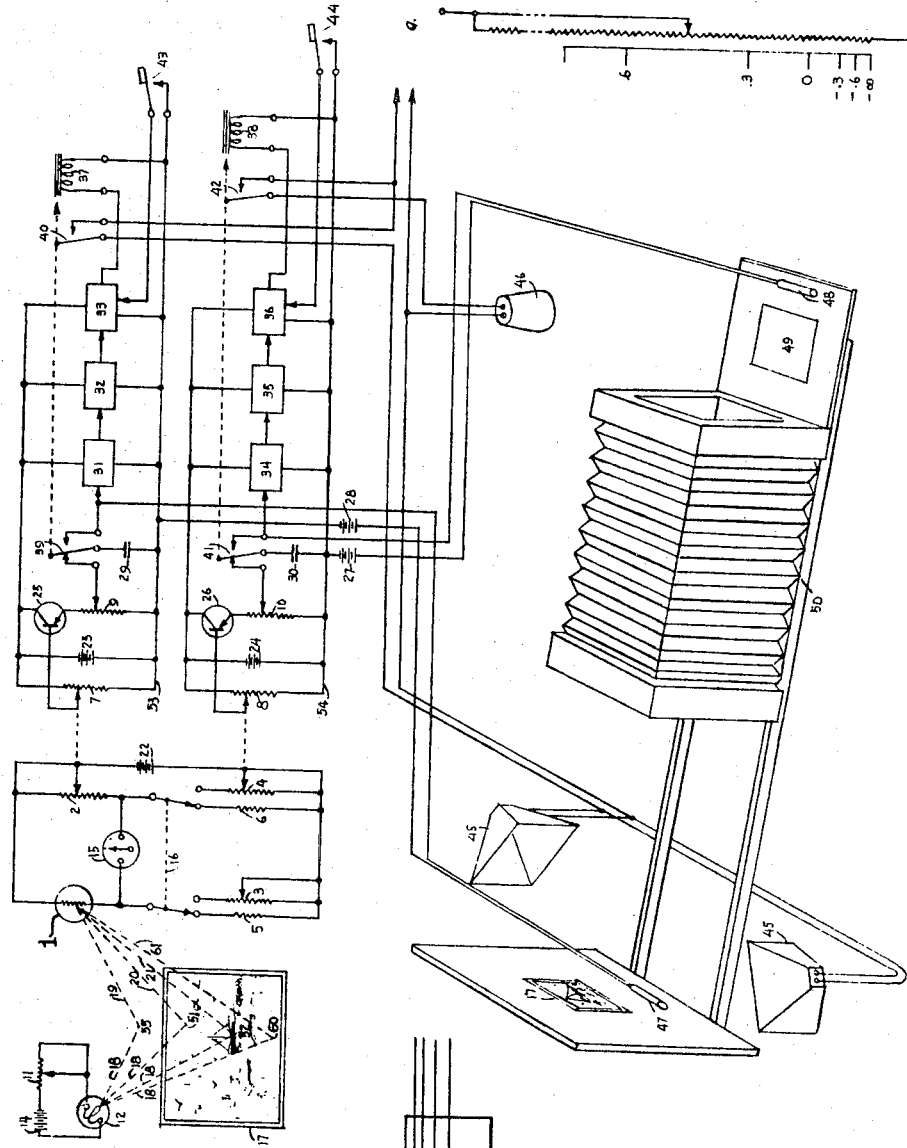
FIG. 1 is a combination pictorial, block and schematic diagram illustrating the basic elements of a system according to the present invention and showing how they are interrelated and applied in carrying out the objects of the invention.
FIG. 2 is a diagram showing the relationship between the resistance elements of potentiometers employed in the system of FIG. 1 and also the manner in which they are calibrated.
FIG. 4 is a diagrammatic view of a movable density probe unit employed in the present invention.

Referring to FIGS. 1 and 2, there can be seen associated with the potentiometer 2 a scale logarithmically related to the potentiometer's resistance element and calibrated in steps of 0.10 density units (−) and (+), the 0 density position being shown at 20 percent of the total resistance of the potentiometer 2. This results in a scale range from (−) infinite density through 0 to approximately +.68D. This relationship is clearly shown in the enlarged portion A of FIG. 2, and is expressed by the following equation:

$$R_{2cal} = 10^D \cdot R_{20cal}$$

where $R_{2cal}$ is the scale value, D is density, and $R_{20cal}$ is the resistance value at the 0 position.

To simplify the following discussion, reference will be made to FIG. 1 showing lamp 12 projecting beams 18 on areas 51, 52, 55 and 60 and respective reflected beams 20, 21, 19 and 61 striking photoresistive cell 1. It should be understood that while FIG. 1 shows the use of the present invention in its application to reflective copy, it also, with equal facility, can be applied to transparency copy in which case beams 18 from lamp 12 would be impinging on areas 51, 52, 55 and 60, and respective rays 20, 21, 19 and 61 will result after being transmitted through copy 17, etc.

Note that when switch 16 is in the left position a resistance bridge is established consisting of photoresistive cell 1, potentiometer 2 and ratio arm fixed resistors 5 and 6. The bridge is energized by battery 22, and in its balanced condition it provides a 0 deflection of the pointer of meter 15.

The bridge is originally calibrated by setting potentiometer 2 to the density value of a known reflection of transmission density standard. Light from lamp 12 energized from battery 14 is then projected on this density standard so that the light thus reflected or transmitted enters photoresistive cell 1. The bridge is then balanced by varying the light output of lamp 12 by adjusting potentiometer 11. To those skilled in the art it will be apparent that the optical geometry involved should be rigidly fixed to assure reproducible accuracy.

After this original calibration it can be seen that if the light from lamp 12 is allowed to impinge on other density areas to be measured, such as beam 18 to area 51 on picture 17, then the reflected or transmitted beam 20 entering photoresistive cell 1 will change the cell 1 resistance in inverse proportion to the intensity of the impinging beam 20. Potentiometer 2 will then have to be adjusted to reestablish the bridge balance as indicated by meter 15.

Because the scale associated with potentiometer 2 is calibrated in density units, it will indicate directly the density of the area under observation. Furthermore, the resistance across potentiometer 2 will vary in inverse proportion to the intensity of the beam entering cell 1, or in direct proportion to the antilog of density ($10^D$) under observation.

$$D = \log_{10} \frac{1}{\text{Percent Transmission or Percent Reflection}}$$

As an example, if the density under observation is 0.3 and the resistance of potentiometer 2 set at 0 density is K ohms, then the new setting of potentiometer 2 will be 20K ohms, because the intensity of beam 20 decreased to one-half of what its value would have been if beam 19 were impinging on an area of 0 density.

$$10^{0.3} = 2; \quad 2 \times 10K \text{ ohms} = 20K \text{ ohms}.$$

In the following mathematical treatment, I represents the intensity of the beam and D represents the reflection or transmission density of the area under observation. R represents resistance and V represents voltage. The subnumbers 19, 20, 21 and 61 used with I, R and V will denote the value of I, R and V when respective beams 19, 20, 21 or 61 act on 1; also, the subnumbers 51, 52, 55 and 60, used with D, refer to the density of the areas under observation and the subnumber 18 used with I refers to the intensity of the beam incident on the copy.

The subnumbers employed with R represent the resistances of the respective elements, for example, $R_2$ is the resistance of element 2, $R_7$ is the resistance element 7, etc.

A movable density sensing optical probe unit 70 is employed, containing the lamp 12, and the photosensitive element 1. This unit can be placed at any location on the copy 17 whose density is to be investigated.

$$I_{20} = K \cdot I_{18} \cdot 10^{-D_{51}}, \text{ and } I_{19} = K \cdot I_{18} \cdot 10^{-D_{55}}$$

$$\frac{I_{20}}{I_{19}} = \frac{K \cdot I_{18}}{K \cdot I_{18}} \cdot \frac{10^{-D_{51}}}{10^{-D_{55}}}$$

$I_{19}$ = a constant after calibration $D_{55} = 0$

K = a constant fixed by the optical geometry of 12, 1 and the surface of 17; therefore:

$$\frac{I_{20}}{I_{19}} = \frac{10^{-D_{51}}}{10^{-D_{55}}} = 10^{-D_{51}}$$

The resistance of 1, $R_1$ is inversely proportional to its radiant input.

$R_1 = \frac{1}{I}$; therefore $R_{120} = \frac{1}{I_{20}}$ and $R_{119} = \frac{1}{I_{19}}$, which makes $$\frac{R_{120}}{R_{191}} = \frac{I_{19}}{I_{20}} = \frac{1}{10^{-D_{51}}} = 10^{-D_{51}}; \text{ when the bridge is balanced:}$$

$$\frac{R_{120}}{R_{220}} = \frac{R_5}{R_6} \text{ and } \frac{R_{119}}{R_{219}} = \frac{R_5}{R_6}; \text{ therefore}$$

$$\frac{R_{120}}{R_{220}} = \frac{R_{119}}{R_{219}}, \text{ or } \frac{R_{120}}{R_{119}} = \frac{R_{220}}{R_{219}}, \text{ which makes}$$

$$\frac{R_{220}}{R_{219}} = 10^{D_{51}}$$

Now because the sliders of $R_2$ and $R_7$ are mechanically connected together and the slider position for zero resistance of $R_2$ corresponds to the slider position for zero voltage of $R_7$ with respect to bus 53, the voltage ratio at the slider of $R_7$ will be:

$$\frac{V_{7_{20}}}{V_{7_{19}}} = \frac{R_{2_{20}}}{R_{2_{19}}} = 10^{D_{51}}, \text{ or simply}$$

$$V_7 \cdot K = 10^{D_{51}}$$

This states that the voltage at the slider of $R_7$ is directly proportional to the antilog of the density under observation, because $V_{7_{19}}$ is a constant reference voltage resulting from area 55, which has a practical density plateau of zero.

The upper right portion of FIG. 1 illustrates the integrator trigger system which controls the amount of screened or screened plus no-screen exposure that is required to reproduce an optimum highlight dot in the reproduction from a prechosen area in the original copy (usually the minimum density area) "Minimum Density Shift". This portion of FIG. 1 may also be used to reproduce an optimum shadow dot in the reproduction from a prechosen shadow area in the original copy (usually the maximum density area) "Maximum Density Shift".

The emitter of transistor 25 or the upper end of potentiometer 9 will always be practically at the same potential as the slider of potentiometer 7. This is so because the series combination of the total resistance of potentiometer 9 plus the emitter-to-base resistance of transistor 25 is high compared to the resistance of potentiometer 7, which it shunts.

With further reference to FIG. 1, it can be seen that the resistance ratio from the slider of $R_9$ to bus 53, compared to the total $R_9$ resistance is the proportion of slider $R_7$ voltage applied to condenser 29 through the left contacts 39 of relay 37. The potential charge on condenser 29 then becomes:

$$V_{C_{29}} = \frac{R_{9(\text{slider})}}{R_{9(\text{total})}} \cdot V_7$$

It can now be seen that potentiometer 9, which preferably has an arbitrary linear calibration, is is the control which establishes the base magnitude of the potential applied to condenser 29. This base magnitude of potential is, of course, subject to variation according to the antilog of density D, under observation.

$$V_{C_{29}} = \frac{R_{9(\text{slider})}}{R_{9(\text{total})}} \cdot K \cdot 10^D$$

Still referring to FIG. 1, manually operated momentary exposure start switch 43 is closed. This energizes relay coil 37 and holds contacts 40 and normally open contacts 39 closed through the holding circuit and relay power supply symbolized by block 33. Capacitor 29, which has been charged to the potential of the slider on potentiometer 9, is now shunted by the series combination of battery 28 and photoresponsive device 47. The polarity of battery 28 opposes the charge on condenser 29. The photoresponsive device 47 should be preferably of the vacuum photoemissive type which has a substantially linear current vs. radiant energy characteristic. Contacts 40 turn on the camera lamps 45-45, which in turn illuminate the copy 17 and the photoresponsive device 47. Capacitor 29 then discharges through photoresponsive device 47 at a time rate directly proportional to the intensity of impinging light from lamps 45-45. It can be seen that the initial potential on capacitor 29, minus the potential at any instant, is analogous to the total radiant input to photoresponsive device 47, up to that instant. Therefore, if the discharge of capacitor 29 is allowed to proceed until it is totally discharged, its initial charge then is analogous to the radiant input to photoresponsive device 47 and also to copy 17 being photographed.

This radiant energy integrator principle is explained in somewhat greater detail in the present inventor's prior patents, U.S. Pat. No. 2,408,576, U.S. Pat. No. 2,944,190 and U.S. Pat. No. 3,269,287; therefore, no further discussion of this principle will be given here.

Block 31 is preferably a practical infinite impedance type input amplifier, such as a negative grid vacuum tube without grid return, or a field effect transistor. Extremely high resistances are important here, as any discharge path for capacitor 29, other than the battery 28 and photoresponsive device 47, will interfere with the linearity, accuracy and stability of the integrator.

Block 32 symbolizes a stable trigger and voltage sensing circuit, having low hysteresis and able to accurately sense through amplifier block 31 the precise instant that the potential of capacitor 29 reaches zero (during its discharge through photoresponsive device 47) and at this instant to trigger the holding circuit of block 33, thus deenergizing coil 37, which enables contacts 40 to open, thus turning off lamps 45-45, also returning contacts 39 to their normally closed condition, thus enabling capacitor 29 to charge in readiness for the next exposure.

A practical example of how the Minimum Density Shift is accomplished and employed will now be discussed. Copy 17 is to be reproduced as a screened negative in which it is desired to produce an optimum geometric size highlight dot from the minimum density area 51. Beam 18 from lamp 12 is allowed to impinge on area 51 (Minimum Density Area). Reflected beam 20 enters photoresistive cell 1. Switch 16 is in the left hand position. The bridge is balanced, indicated by no deflection of the pointer on meter 15, by manually adjusting potentiometer 2. The slider of $R_7$, because it is mechanically connected to the slider on $R_2$ now assumes a negative voltage with respect to bus 53 that will always be in direct proportion to the antilog of density ($10^D$) under observation, in this case, area 51. This $R_7$ slider voltage is applied to the base of transistor 25 and appears across potentiometer 9.

The sensitivity of photoresponsive device 47 should be previously adjusted by the use of neutral density filters, irises, graduated screen tints, or suitable devices to modulate the light entering and impinging upon the cell's photosensitive element. The purpose of adjusting the sensitivity of cell 47 is to secure a range of exposures based on the intensity of lamps 45-45, the sensitivity of the photographic material being exposed, the aperture ratio, and other factors known to those skilled in the art. Once this sensitivity is established for the working conditions, it should remain fixed, and potentiometer 9 is then utilized as a means of establishing base exposures for the different types of screens and the various characters of reproduction results desired. It does this by selecting a portion of the $R_7$ potential, which portion is applied to condenser 29 through the left contacts of relay 37.

Copy 17 is placed on the easel of camera 50 and then photographed with a single screened exposure or combination of a screened and no-screen exposure, or other exposures as desired by the operator. The object of this first test is to find a setting for potentiometer 9 that will reproduce the optimum geometric size highlight dot required for the process from the area in the copy first observed (in this case the minimum density area 51). Once this setting for potentiometer 9 is determined, it remains constant for the screen, the type film used, and the character of reproduction required.

It should now be apparent that for the same setting of potentiometer 9, the operator can reproduce this optimum highlight dot automatically from any highlight area in all subsequent copies. In practice, however, the optimum size highlight dot is usually reproduced from the minimum density area of most copies.

Attention is now directed to FIG. 1 and FIG. 2, and more specifically to potentiometers 3 and 4 illustrated in the circuit of FIG. 1 and in the enlarged drawing of FIG. 2, which shows typical density calibrations in scale relationship to the resistance elements of the potentiometers. These relationships are expressed by the following equations:

$$R_{3_{cal}} = \frac{R_5}{R_6} \cdot R_{4\,total} \cdot 10^{D_{sr}}$$

$$R_{4_{cal}} = R_{4_{total}} \cdot 10^{-D_{ex}}$$

It should be noted that the calibration of potentiometer 3 refers to the screen range established by the exposure or exposures and other photographic parameters previously noted and expresses the ability of the screen to reproduce a particular range of tones unaided by a flash exposure. The calibration of potentiometer 4 expresses the excess density range in the copy not accommodated by the screen range.

A number of techniques for determining screen range are known to those skilled in the art. However, an automatic technique for setting potentiometer 3 to the screen range (a prerequisite for further operation of the instrument) will now be described.

The slider on potentiometer 2 is allowed to remain at its setting described previously when area 51 was examined and recorded, with switch 16 in the left-hand position. At this time, a base exposure (simple or complex) was established, sufficient to produce the optimum geometric size highlight dot (required for the process) from this area. Switch 16 is now positioned to the right, thus establishing a resistance bridge consisting of $R_1$, $R_2$, $R_3$ and $R_4$. Beam 18 from lamp 12 is then impinged on area 60, allowing reflected beam 61 to affect photoresistive element 1. Area 60 in copy 17 is chosen as that intermediate density area in which the corresponding area of the negative reproduced (by the established base exposure, in which area 51 was reproduced as an optimum highlight dot) the optimum geometric size shadow dot required for the process.

Potentiometer 4 is now set at the "0" no excess density position and the bridge is again balanced by adjusting the slider on potentiometer 3.

When the bridge is balanced:

$\frac{R_{1_{61}}}{R_{2_{20}}} = \frac{R_3}{R_4}$, noting that $\frac{R_{1_{19}}}{R_{2_{19}}} = \frac{R_5}{R_6}$, or $R_{1_{19}} \cdot R_6 = R_{2_{19}} \cdot R_5$; then $$\frac{\frac{R_{1_{61}}}{R_{1_{19}} \cdot R_6}}{\frac{R_{2_{20}}}{R_{2_{19}} \cdot R_5}} = \frac{R_3}{R_4}; \text{ therefore because}$$

$\frac{R_{1_{61}}}{R_{1_{19}}} = 10^{D_{60}}$ and $\frac{R_{2_{20}}}{R_{2_{19}}} = 10^{D_{51}}$, then $$\frac{\frac{10^{D_{60}}}{R_6}}{\frac{10^{D_{51}}}{R_5}} = \frac{10^{D_{60}}}{R_6} \cdot \frac{R_5}{10^{D_{51}}} = \frac{10^{D_{60}}}{10^{D_{51}}} \cdot \frac{R_5}{R_6} = \frac{R_3}{R_4}$$

Now according to the calibration of $R_3$ and $R_4$:

$$\frac{R_3}{R_4} = \frac{\frac{R_5}{R_6} \cdot R_4\, total \cdot 10^{D_{sr}}}{R_4\, total \cdot 10^{-D_{ex}}} = \frac{R_5}{R_6} \cdot \frac{10^{D_{sr}}}{10^{-D_{ex}}}$$

Also, as stated above $\frac{R_3}{R_4} = \frac{10^{D_{60}}}{10^{D_{51}}} \cdot \frac{R_5}{R_6}$; therefore $\frac{10^{D_{60}}}{10^{D_{51}}} \cdot \frac{R_5}{R_6} = \frac{R_5}{R_6} \cdot \frac{10^{D_{sr}}}{10^{-D_{ex}}}$, or stated logarithmically $D_{60} - D_{51} = D_{sr} + D_{ex}$ Because the excess density potentiometer $R_4$ was set at zero, it can now be seen that balancing the bridge, by adjusting the screen range potentiometer $R_3$, will automatically set $R_3$ at the density difference between the areas in the copy that reproduced respectively an optimum highlight dot and an optimum shadow dot.

This difference is known to those skilled in the art as the screen range and is defined as the ability of the screen to reproduce a range of tones by any exposure or combination of exposures (as described previously) but without the aid of a flash or fogging exposure.

Settings for screen range potentiometer 3 and base exposure potentiometer 9 have now been determined and will remain set for the particular screen, type of film used, processing conditions, and character of reproduction required.

It should be noted that in a particular instrument it may be desirable to employ a multiple number of base exposure potentiometers 9, that may be preset for multiple or complex exposure techniques. Any suitable means can then be used to switch from one to another as required. It can also be seen that the antilog of density in the copy under observation will then factor all these base exposures.

It is now necessary, to determine the amount of base flash, or fogging exposure of flash lamp 48, sufficient to produce, upon processing film 49, the optimum geometric size shadow dot required for the process.

Examination of FIG. 1 will disclose that the top circuit controlling base exposures and comprising elements 7, 23, 25, 9, 29, etc. is similar to the bottom circuit comprising elements 8, 24, 26, 10, 30, etc. which controls base flash exposures. The operation of the top circuit has previously been described, therefore a discussion of the operation of the bottom or base flash, circuit, being the same, will not be repeated.

It is important that the sensitivity of photoresponsive device 48 be previously adjusted by the use of neutral density filters, irises, graduated screen tints, or any other suitable device to modulate the light entering and impinging upon the cell's photosensitive element. The purpose of adjusting the sensitivity of cell 48 is to secure a range of exposures based on the intensity of flash lamp 46, the sensitivity of the photographic material being exposed, the density of the screen employed, and other factors known to those skilled in the art. Once this sensitivity is established for the working conditions, it should remain fixed. Potentiometer 10 is then utilized as a means of establishing base exposures for the different types of screens and the various characters of reproduction results desired. It does this by selecting a portion of the $R_8$ potentiometer voltage, which portion is applied to condenser 30 through the left contacts 41 of relay 38.

For the purpose of establishing the base flash, excess density potentiometer 4 is manually set at its infinite density calibration mark. Now, because the sliders of $R_4$ and $R_8$ are mechanically connected together and the slider position for zero resistance (infinite excess density, see FIG. 2) corresponds to the slider position for maximum voltage with respect to bus 54 on $R_8$, then maximum voltage will be applied across base flash potentiometer $R_{10}$.

Film 49 is placed in the camera 50, covered with the desired screen, and then flash-exposed with lamp 46. The object of this test is to find a setting for potentiometer 10 that will produce the proper exposure to reproduce, upon processing, the optimum geometric size shadow dot required for the process. Once this base flash setting for potentiometer 10 is determined, it remains constant for the screen, the type film used, and the processing conditions.

Attention is directed to the fact that the actual flash exposure given is a proportion of the base flash established above, and this proportion is determined by the setting of excess of density potentiometer 4. The relationship between the voltage at the slider of $R_8$ with respect to bus 54 and the resistance of $R_4$ can be seen to be:

$$\frac{V_{8slider}}{V_{8total}} = 1 - \frac{R_4}{R_{4total}}; \text{ now}$$
$$R_4 = R_{4total} \cdot 10^{-Dex}; \text{ therefore}$$
$$\frac{V_{8slider}}{V_{8total}} = 1 - 10^{-Dex}, \text{ or simply}$$
$$V_8 \cdot K = 1 - 10^{-Dex}$$

This equation demonstrates that the portion of total voltage appearing across potentiometer 10 is equal to one minus the reciprocal of the antilog of excess density.

It can be seen that the resistance ratio from the slider of $R_{10}$ to bus 54 compared to the total $R_{10}$ resistance is the proportion of slider $R_8$ voltage applied to condenser 30 through the left contacts 41 of relay 38. The voltage charge on condenser 30 then becomes:

$$V_{C30} = \frac{R_{10slider}}{R_{10total}} \cdot V_8 \cdot K, \text{ and because}$$
$$V_8 \cdot K = 1 - 10^{-Dex}, \text{ then}$$
$$V_{C30} = \frac{R_{10slider}}{R_{10total}} \cdot (1 - 10^{-Dex})$$

This shows that the integrator condenser potential $V_{C30}$ is of course subject to variation according to the excess density in the manner indicated.

The above mentioned condenser 30 voltage ($V_{C30}$) then controls the amount of flash exposure received by film 49 from lamp 46 which is monitored by photosensitive device 48 in a similar manner and as previously described for integrating condenser 29 in the upper section of FIG. 1.

An example of the actual use of the instrumentation will now be described. It should be noted that base detail exposure potentiometer 9 has been set as previously described for the type film, processing conditions, geometric size highlight dot required, etc. Also, base flash potentiometer 10 and screen range potentiometer 3 have been set as previously described.

Switch 16 is placed in its left position; the minimum density area 51 of copy 17 is then observed by impinging beam 18 thereon and allowing reflected beam 20 to enter photosensitive device 1. Minimum density potentiometer 2 is then adjusted for bridge balance; then leaving potentiometer 2 in its set position, switch 16 is then positioned to the right. Area 52, the maximum density area of the copy, is then observed by impinging beam 18 thereon, allowing reflected beam 21 to enter and affect photosensitive device 1. At this time, excess density potentiometer 4 is adjusted for bridge balance.

flash exposure is now given to film 49 by of closure f switch 44. After the flash exposure is completed, the easel of camera 50 is placed in its focal plane position and film 49 is exposed to copy 17 by momentary closure of switch 43. It can be seen that these two exposures may be given simultaneously if flash lamp 46 is positioned inside the camera proper and photosensitive device 48 is allowed to exclusively respond to the output of lamp 46.

It should now be apparent to those skilled in the art that, although the present invention is complex in theory, it is basically simple in its use and application. It should be noted that when entering the minimum and maximum density areas of the copy, digital information is displayed on the dials. This information, however, is academic, and readout is not necessary in the normal use of the instrument. Also, setting the dials to digital information is not normally required. The operator merely operates the dials of the potentiometers 2, 3 or 4, as the case may be, until the pointer on meter 15 is centered.

Further operator convenience is available in locating the minimum and maximum density areas of the copy more accurately than can be done visually. This is accomplished by watching the pointer of meter 15 while the optical unit 70 comprising lamp 12 and photoresponsive device 1 is being moved from one area to another on copy 17. Maximum deflection of the meter 15 pointer to the right will indicate maximum density, and conversely to the left, minimum density.

The maximum density shift equation $E_a = E_b **$ $$\frac{1}{10(Dsr - Dmax)}$$

is applied automatically in those special cases where the copy range is less than the screen range. In the normal procedure, the minimum density of copy 17 is entered first by adjusting potentiometer 2 with switch 16 in the left position and with the optical system 12-1 observing the minimum density of the copy. Switch 16 is then positioned to the right and the optical system 12-1 is positioned on the maximum density area of copy 17. It will now be found that potentiometer 4 reaches the zero excess density, or no flash, position before the pointer on meter 15 can be centered. This signals the operator that the copy range is less than the screen range and also reduces the flash to zero, which is correct for this type of copy. The operator leaves potentiometer 4 at its zero position and then centers the pointer on meter 15 by readjusting potentiometer 2 from its original setting. This will shorten the detail exposure or exposures so as to place the maximum density area of copy 17 in the optimum shadow dot region of the reproduction.

The following analysis demonstrates the validity of the above conclusions:

$$D_{60} - D_{51} = Dsr + Dex$$

Note that $D_{51}$ is entered on potentiometer 2 and represents the minimum density area of the copy. Also that $D_{60}$ appears across photoresponsive device 1 as a resistance representing the maximum density area of the copy. Therefore:

$$Dmax - Dmin = Dsr + Dex$$
In the demonstration above, $Dex = 0$; therefore
$$Dmin = Dmax - Dsr, \text{ or as anti-logs:}$$
$$10\ Dmin = \frac{1}{10(Dsr - Dmax)}$$

It has been explained previously that potentiometer 2, due to its linkage with potentiometer 7, factors base exposures set on potentiometer 9. It therefore can be seen that the expression $$\frac{1}{10(Dsr - Dmax)}$$

agrees with the $E_b$ factor in the maximum density shift equation.

It is known to those familiar with the art that increased no-screen exposure should be given in the special case above (or other techniques employed) in order to shorten the effective screen range thereby closing up the highlights caused by the decrease in the original detail exposure.

In FIGS. 3A and 3B there is shown a schematic diagram depicting a specific practical embodiment of the present invention. A detailed description of this practical circuit is not necessary because those skilled in the electronics art can readily discern the interrelation of its elements and can also understandably compare the practical circuit functions with the broad general block diagram of FIG. 1.

Many modifications of the present invention are possible without deviating from its scope and purpose, and of necessity it would make this disclosure too lengthy to attempt to anticipate every possible type. However, the following modifications are anticipated and will serve to illustrate expansions and variations of this invention without deviating from its general scheme.

It would be advantageous in some aspects of the present invention to separate the densitometer computer section comprising the elements 1, 2, 3, 4, 5, 6, 15, 16, 22, 11, 12 and 14 from the rest of the instrument. With the instrument thus divided, all copy could then be densitometrically analyzed at a central location by one operator. An integral suitable device would then punch or mark a card indicating the computed positions of the potentiometers 2 and 4, which card would then be attached to the copy. The cameras in the plant would be equipped with the integrators and lamp control portions of the invention. The punched or marked card attached to the copy would then be utilized in suitable fashion to position potentiometers 7 and 8, either by manual-visual or automatic means.

It may be more convenient in some applications of the present invention to use a sampling technique for exposing photo responsive devices 47 and 48 by employing another lamp or lamps contained within the main cabinet of the instrument. The photoresponsive device 47 or 48 would then be exposed to the light emitted from the sampling lamp instead of the camera lamps. A prerequisite for the feasibility of this technique is that the camera lamp and corresponding sampling lamp be of the same general type, such as incandescent, etc., and that both be connected to the same electrical mains. The output from both the sampling and camera lamps would then vary in proportion to the voltage fluctuations of the mains.

Under certain special conditions, such as the use of constant intensity camera and flash lamps, the light integrating feature of the present invention may not be required. If this condition is encountered and densitometrically controlled and computed timing is indicated, this may be accomplished by substituting constant current means in place of photoresponsive devices 47 and 48.

Another variation of the present invention can be achieved by operating potentiometers 2—7 and 4—8 with motors controlled by the signal output from the bridge circuit. This method would be more automatic than the manual-visual method described in the above disclosure.

A further expansion of the present invention would be in the use of photoresponsive device 1 (together with a continuous light attenuator for order-of-magnitude adjustment) as a means of directly reading the light impinging upon the focal plane of an enlarger or camera system. In this way indirect measurement of the copy minimum and maximum density areas and other areas, as the case may be, can be read and fed into the computer section of the instrument. Those skilled in the art will recognize that this method has the advantage of automatic exposure correction for various reproduction scales.

While certain specific embodiments of an instrument for automatically calculating and controlling photographic exposures have been disclosed in the foregoing description, it will be understood that various further modifications within the spirit of the invention may occur to those skilled in the art. Therefore it is intended that no limitations be placed on the invention except as defined by the scope of the appended claims.

I claim:

1. An apparatus for producing photographic reproductions from copy employing means that utilizes the copy's densities to compute the exposures required and means to expose the photosensitive material to said computed exposures, comprising a camera or enlarger system having the usual support for copy and easel for photosensitive material, circuit means including a light responsive probe which can be positioned at different areas of the copy to respond to said area's densities, said circuit means having settable light integrating means, copy exposure lamp means positioned to illuminate the copy, means energizing said copy exposure lamp means for a duration in accordance with the density of a selected area in the copy or to a computed combination of densities, circuit means to compute and set screen range and means for computing excess copy density range relative to said screen range, and flash lamp means located to illuminate said photosensitive material including settable light integrating means to energize said flash lamp means for a duration to provide an integrated flux in accordance with the said excess density range of the copy relative to the screen range.

2. An apparatus for producing screened photographic reproductions from copy employing means that utilizes the copy's densities to compute the exposures required and means to expose photosensitive material to said computed exposures, comprising a camera or enlarger system having the usual support for copy and easel for photosensitive material, circuit means including a light responsive probe which can be positioned at different areas of the copy to respond to the said areas' densities, said circuit means having light integrating means which may be set to a selected basic exposure, copy exposure lamp means located to illuminate the copy, means energizing said copy exposure lamp means for a duration in accordance with a modification of the set basic exposure of said light integrating means, whereby the flux provided the copy will be the product of the said basic exposure multiplied by the antilog of selected highlight density in the copy at which the said light responsive probe had first been positioned, said circuit means having further means for setting the density difference between those densities in the copy that reproduced respectively an optimum highlight dot and an optimum shadow dot without a flash exposure, corresponding to the screen density range, and means in said circuit means to compute the excess of the copy density range relative to the screen density range utilizing the previously selected and set highlight density, the previously computed and set screen density range and a selected shadow density area in the copy at which the light responsive probe is positioned, flash lamp means located to illuminate said photosensitive material, and light integrating means to set a selected basic flash exposure, and means to energize said flash lamp means for a duration to provide an integrated flux which is a portion of said basic flash exposure in accordance with the excess of the density range of the copy relative to the screen range, said integrated flash flux being the product of said basic flash exposure multiplied by the quantity one minus the reciprocal of the antilog of excess density.

3. The apparatus of claim 2, wherein if the copy range is less than the screen range, said exposure lamp means will be energized for a duration in accordance with a modification of the set basic exposure of said light integrating means, whereby the flux provided the copy will be the product of said set basic exposure multiplied by the reciprocal of the antilog of the quantity of said screen range minus the density of a selected shadow area of the copy at which the said light responsive probe is placed.

4. An apparatus for producing screened photographic reproductions from copy by densimetrically controlled and computed exposures comprising a camera or enlarger system having a support for copy and an easel for photosensitive material to be exposed, a bridge circuit including in one arm thereof a movable light responsive resistor which can be positioned at different areas of the copy to respond to their respective densities, said bridge circuit having a second arm including an adjustable second resistor for balancing the bridge circuit, selectively settable light integrating means, and copy exposure lamp means located to illuminate the copy, means energizing said copy exposure lamp means for a duration in accordance with the setting of said light integrating means modified by said second resistor, whereby the flux provided the copy can be in accordance with a measured selected density of the copy or to a computed combination of densities, said bridge circuit having a third arm including an adjustable third resistor for balancing the bridge circuit, means to adjust said third resistor to a value at balance representing the density difference between the two areas in the copy that produced respectively an optimum highlight and an optimum shadow dot in the reproduction without a flash exposure, said third resistor's value thus corresponding to the screen range, said bridge circuit having a fourth resistive arm, selectively settable second light integrating means to set basic flash exposures including flash lamp means located to illuminate said photosensitive material, and means to energize said flash lamp means for a duration to provide a flux in accordance with the setting of said second light integrating means modified by said fourth resistive arm.

5. The apparatus of claim 4, and wherein the means to modify said basic flash exposure comprises the said adjustable fourth resistor in said fourth arm for balancing the bridge circuit, means to adjust said fourth resistor to a value at balance corresponding to the excess density of the copy density range relative to the screen density range as computed by said bridge circuit utilizing said second resistor previously set to correspond to a selected highlight density area of the copy and said third resistor previously set to correspond with the screen range and said light responsive resistor probe sensing a selected shadow area of the copy.

6. An apparatus for producing screened photographic reproductions from copy comprising a camera or enlarger system having a support for copy and an easel for photosensitive material to be exposed, a bridge circuit including in one arm thereof a movable light responsive resistor probe which can be positioned at different portions of the copy to respond to their respective densities, said bridge circuit having a second arm including an adjustable second resistor for balancing the bridge circuit, light integrating means, means to control the flux resulting from said light integrating means in accordance with the adjustment of said second resistor, copy exposure lamp means located in a position to illuminate the copy, means energizing said copy exposure lamp means for a duration in accordance with said light integrating means, whereby the flux provided can be in accordance with the density of a selected highlight area of the copy or a computed combination of densities, said bridge circuit having a third arm including an adjustable third resistor for balancing the bridge circuit, means to adjust said third resistor to a value at balance representing the density difference between the two areas in the copy that reproduced respectively an optimum highlight dot and an optimum shadow dot in the reproduction without a flash exposure, said third resistor's value thus corresponding to the screen range, said bridge circuit having a fourth resistive arm, flash lamp means located in a position to illuminate said photosensitive material, and means to energize said flash lamp means for a duration to provide a flux in accordance with the excess density of the density range of the copy relative to the screen range.

7. The apparatus of claim 6, and wherein the means to energize said flash lamp means comprises an adjustable fourth resistor in said fourth arm for balancing the bridge circuit, means to adjust said fourth resistor to a value at balance corresponding to the excess density of the copy utilizing said probe resistor, second light integrating means, means to control the setting of said second light integrating means in accordance with the adjustment of said fourth resistor, and means to energize said flash lamp means in accordance with the setting of said second light integrating means.

8. The apparatus of claim 6, and wherein said integrating means and exposure lamp energizing means comprises a capacitor, means to charge said capacitor to a voltage in accordance with the adjustment of said second resistor at balance, a discharge circuit including a current source and a photocell exposed to said exposure lamp means, means to simultaneously connect the capacitor to said discharge circuit and energize the exposure lamp means, and means to terminate energization of said exposure lamp means when the capacitor becomes substantially completely discharged.

9. The apparatus of claim 8, and wherein the means to charge said capacitor comprises a source of current, a transistor having its collector and emitter connected across said last-named source with an impedance in circuit therewith, means to apply a portion of the potential of said last-named source of current controlled in accordance with the setting of said adjustable second resistor to the base of the transistor, and means connecting at least a portion of said impedance across the capacitor.

10. The apparatus of claim 9, and wherein the means to apply said portion of the potential of the last-named source of current to the transistor base comprises a potentiometer connected across said last-named source with its slider connected to said base, and means mechanically or remotely coupling said slider to said adjustable second resistor.

11. The apparatus of claim 8, and wherein the means to simultaneously connect the capacitor to said discharge circuit and energize the exposure lamp means comprises a control relay having respective pairs of contacts in circuit with said lamp means and said capacitor and discharge circuit, a holding circuit connected to said relay and latching said relay energized, and means to momentarily energize said relay so as to render said holding circuit effective, and wherein the means to terminate energization of said exposure lamp means comprises means to release said holding circuit responsive to substantially complete discharge of said capacitor.

12. The apparatus of claim 7, and wherein said second light integrating means and flash lamp energizing means comprising a capacitor, means to charge said capacitor to a voltage in accordance with the adjustment of said fourth resistor at balance, a discharge circuit including a current source and a photocell exposed to said flash lamp means, means to simultaneously connect the capacitor to said discharge circuit and energize the flash lamp means, and means to terminate energization of said flash lamp means when the capacitor becomes substantially completely discharged.

13. The apparatus of claim 12, and wherein the means to charge said capacitor comprises a source of current, a transistor having its collector and emitter connected across said last-named source with an impedance in circuit therewith, means to apply a portion of the potential of said last-named source controlled in accordance with the setting of said adjustable fourth resistor to the base of the transistor, and means connecting at least a portion of said impedance across the capacitor.

14. The apparatus of claim 13, and wherein the means to apply said portion of the potential of the last-named source of current to the transistor base comprises a potentiometer connected across said last-named source with its slider connected to said base, and means mechanically or remotely coupling said slider to said adjustable fourth resistor.

15. The apparatus of claim 12, and wherein the means to simultaneously connect the capacitor to said discharge circuit and energize the flash lamp means comprises a control relay having respective pairs of contacts in circuit with said flash lamp means and said capacitor and discharge circuit, a holding circuit connected to said relay and latching said relay energized, and means to momentarily energize said relay so as to render said holding circuit effective, and wherein the means to terminate energization of said flash lamp means comprises means to release said holding circuit responsive to substantially complete discharge of said capacitor.

16. The apparatus of claims 10, wherein the said mechanical or remote coupling means can include means to transfer the positions of the sliders on the density measuring resistors to the sliders on the integrator resistors by means of a marked or punched card which can convey the positional information.

17. In an apparatus for producing screened photographic reproductions from copy, a device to compute the exposures required comprising circuit means having a plurality of parameters which can be adjusted, said parameters including means responsive to the density of the copy, means to establish a base exposure which can be modified in accordance with the antilog of the density under observation, means adjustable in accordance with a density difference corresponding to the screen range, and means to establish a flash exposure in accordance with the excess density of the copy relative to the screen range.

18. In an apparatus for producing screened photographic reproductions from copy, a device to compute the exposures required comprising circuit means having a portion which can be current-balanced and having a plurality of parameters which can be adjusted for balance, said parameters including means responsive to the density of the copy, means to establish a base exposure which can be modified in accordance with the antilog of the density under observation, means a adjustable in accordance with a density difference corresponding to the screen range, and means to establish a flash exposure in accordance with the excess density of the copy relative to the screen range.

19. The apparatus of claim 17, and wherein the means responsive to the density of the copy comprises movable light sensitive transducer means which can be placed at any selected area of the copy.

20. The apparatus of claim 17, and wherein the means to establish the base exposure comprises means to develop a voltage in accordance with the antilog of the density under observation, exposure timing means, and means to adjust said timing means in accordance with said voltage.

21. The apparatus of claim 17, and wherein said flash exposure is proportional to one minus the reciprocal of the antilog of said excess density.

22. In an apparatus for producing photographic reproductions from copy, a device to compute the exposures required comprising circuit means having a plurality of parameters which can be adjusted to provide a definite current condition in a portion of said circuit means, said parameters including means responsive to the density of the copy, means to establish a basic detail exposure which can be modified in accordance with the antilog of a density under observation, means to establish a base flash exposure, and means to modify said base flash exposure in accordance with one minus the reciprocal of the antilog of the excess density of the copy relative to the screen range.

23. The apparatus of claim 22, and means to modify said basic detail exposure according to the equation:

$$E_a = E_b \cdot \frac{1}{10^{(SR-D_s)}}$$

where $E_a$ is the actual detail exposure;
$E_b$ is the basic detail exposure;
SR is the screen range; and
$D_s$ is the density of a selected shadow area of the copy.